(12) United States Patent
Bugenhagen

(10) Patent No.: US 7,545,739 B1
(45) Date of Patent: Jun. 9, 2009

(54) SYSTEM AND METHOD FOR HYBRID DYNAMIC COMMUNICATION ROUTING

(75) Inventor: Michael K. Bugenhagen, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1000 days.

(21) Appl. No.: 10/840,860

(22) Filed: May 7, 2004

(51) Int. Cl.
*H04L 12/28* (2006.01)

(52) U.S. Cl. .................. 370/230; 370/352; 370/401; 379/207.11

(58) Field of Classification Search .............. 370/230, 370/252, 429, 353, 401, 352; 379/207.11
See application file for complete search history.

(56) References Cited

U.S. PATENT DOCUMENTS

| | | | | |
|---|---|---|---|---|
| 6,167,041 A * | 12/2000 | Afanador | .................. | 370/353 |
| 6,522,741 B1 * | 2/2003 | Crowl | .................. | 379/207.11 |
| 6,603,759 B1 * | 8/2003 | Moskal et al. | .................. | 370/352 |
| 6,807,150 B1 * | 10/2004 | McNiff et al. | .................. | 370/230 |
| 6,954,460 B2 * | 10/2005 | DeMars | .................. | 370/392 |
| 2003/0012214 A1 * | 1/2003 | Munter | .................. | 370/429 |

* cited by examiner

*Primary Examiner*—Gerald Gauthier

(57) ABSTRACT

A system and method for a hybrid dynamic communication routing device is disclosed. The HDCR device monitors the condition of communication paths in a TDM network and in a packet based network. The HDCR adjusts a communication route between a first device and a second device based on the condition of the communication paths.

20 Claims, 3 Drawing Sheets

SYSTEM AND METHOD FOR HYBRID DYNAMIC COMMUNICATION ROUTING

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to communication network architectures and services.

2. Description of the Prior Art

Time division multiplex (TDM) networks may be flat networks. In a flat network each switch or device is connected to every other switch or device. FIG. 1 is a block diagram of a typical flat TDM network. When a connection needs to be made from one switch to another switch there is always a direct connection between the two switches. For example when switch 102 needs to connect to switch 106, the connection is made using trunk 110. Sometimes the direct trunk between switches becomes congested by heavy traffic. Dynamic call routing (DCR) is one method that helps overcome congestion problems. A system using DCR monitors the conditions along the trunks. When a path between two switches has a problem, for example heavy congestion or a trunk failure, the system will use an alternate trunk for the connection. For example, when trunk 110, between switches 102 and 106, has a problem, the system may establish the connection from switch 102 to switch 108 along trunk 112, and then from switch 108 to switch 106 along trunk 114. In this way the connection between switch 102 and 106 is completed without using the trunk with the problem. HDC systems typically monitor the CPU occupancy of a switch or the trunk or link occupancy to track usage at a switch or through a trunk.

Packet based networks don't typically have dedicated links between each network device (i.e. the network is not flat). Packet based networks typically create virtual paths or virtual connections between two IP addresses. A virtual path typically can be created between two network devices in the packet based network even when there may not be a direct physical link between the two network devices. Sometimes the link or connection between two IP addresses are called tunnels, they can also be called routes. Packet based networks use a similar technique to route traffic around congestion or failures in the network structure. Packet based networks may track usage along a virtual connection by counting the number of hops packets take to reach the destination, they may track latency, or they may track percent bandwidth used at the router or port level. Many TDM networks are now connected to packet based networks. Unfortunately there is no sharing of the path conditions between a TDM network and a packet based network.

Therefore there is a need for a hybrid dynamic connection routing system to share routing information between the two types of networks.

SUMMARY OF THE INVENTION

A system and method for a hybrid dynamic communication routing device is disclosed. The HDCR device monitors the condition of communication paths in a TDM network and in a packet based network. The HDCR adjusts a communication route between a first device and a second device based on the condition of the communication paths.

DETAILED DESCRIPTION OF THE PREFERRED EMBODIMENT

Figure 1:
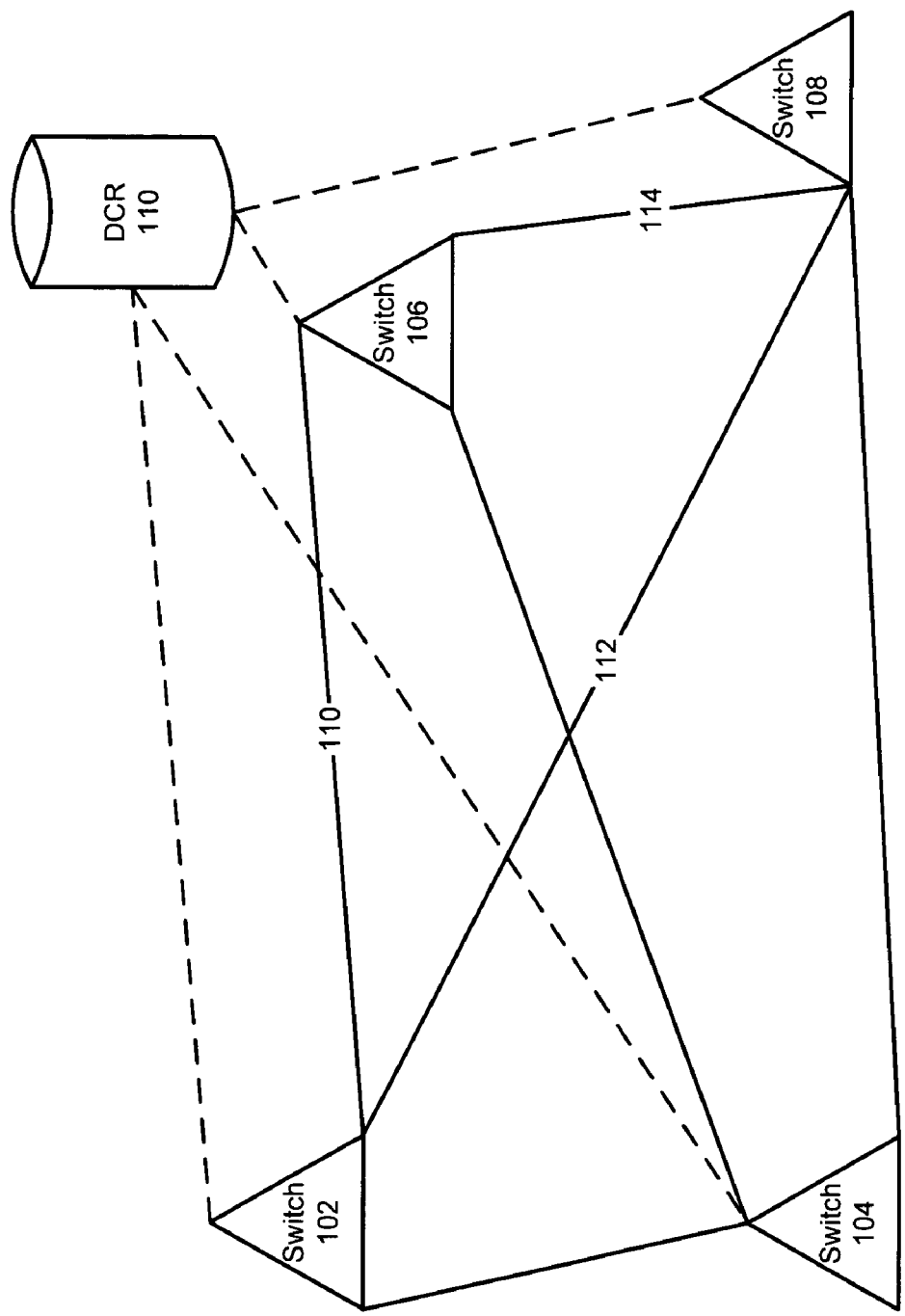
FIG. 1 illustrates a prior art flat TDM network.
Figure 2:
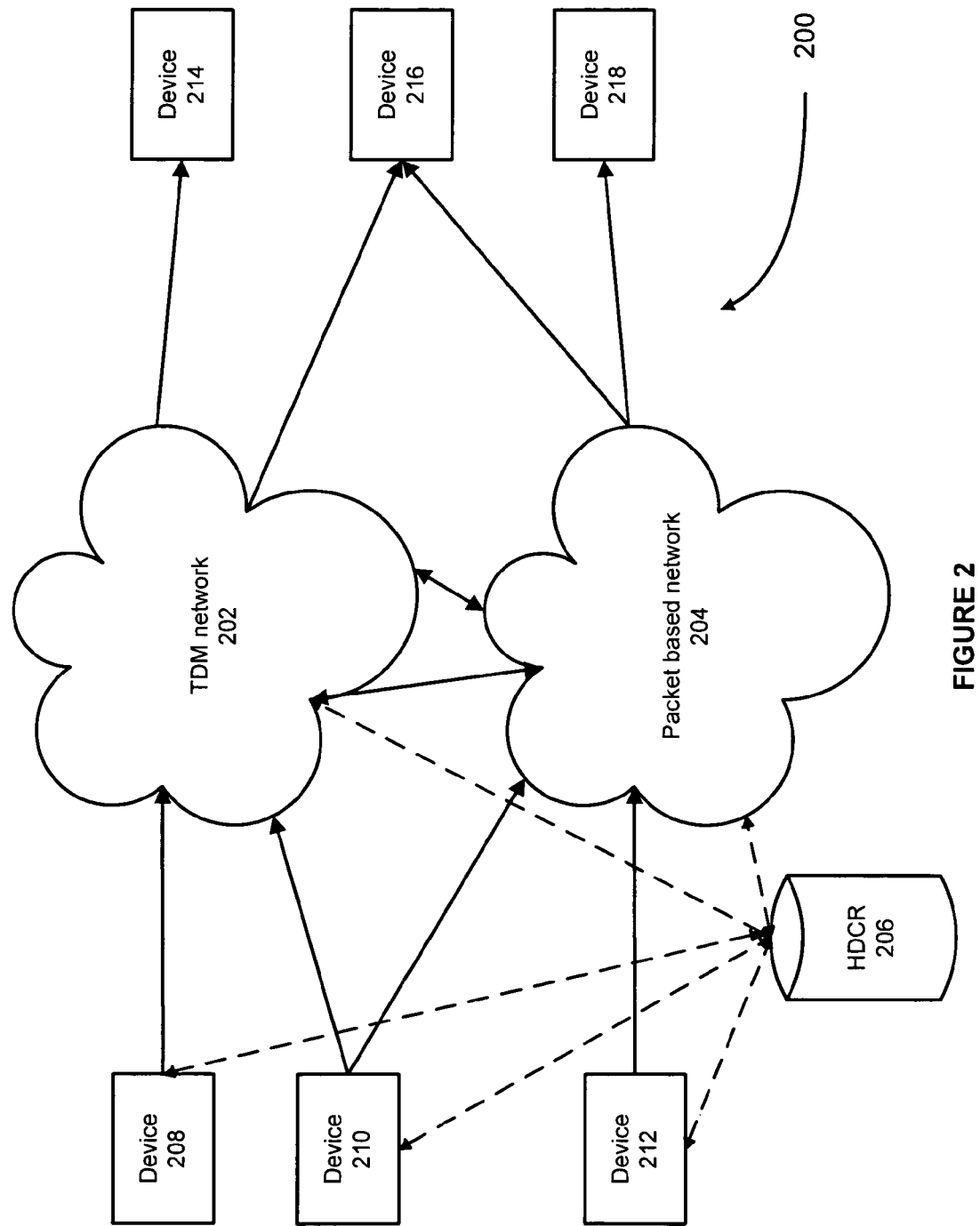
FIG. 2 is a system level view of a hybrid dynamic connection routing architecture in an example embodiment of the invention.
Figure 3:
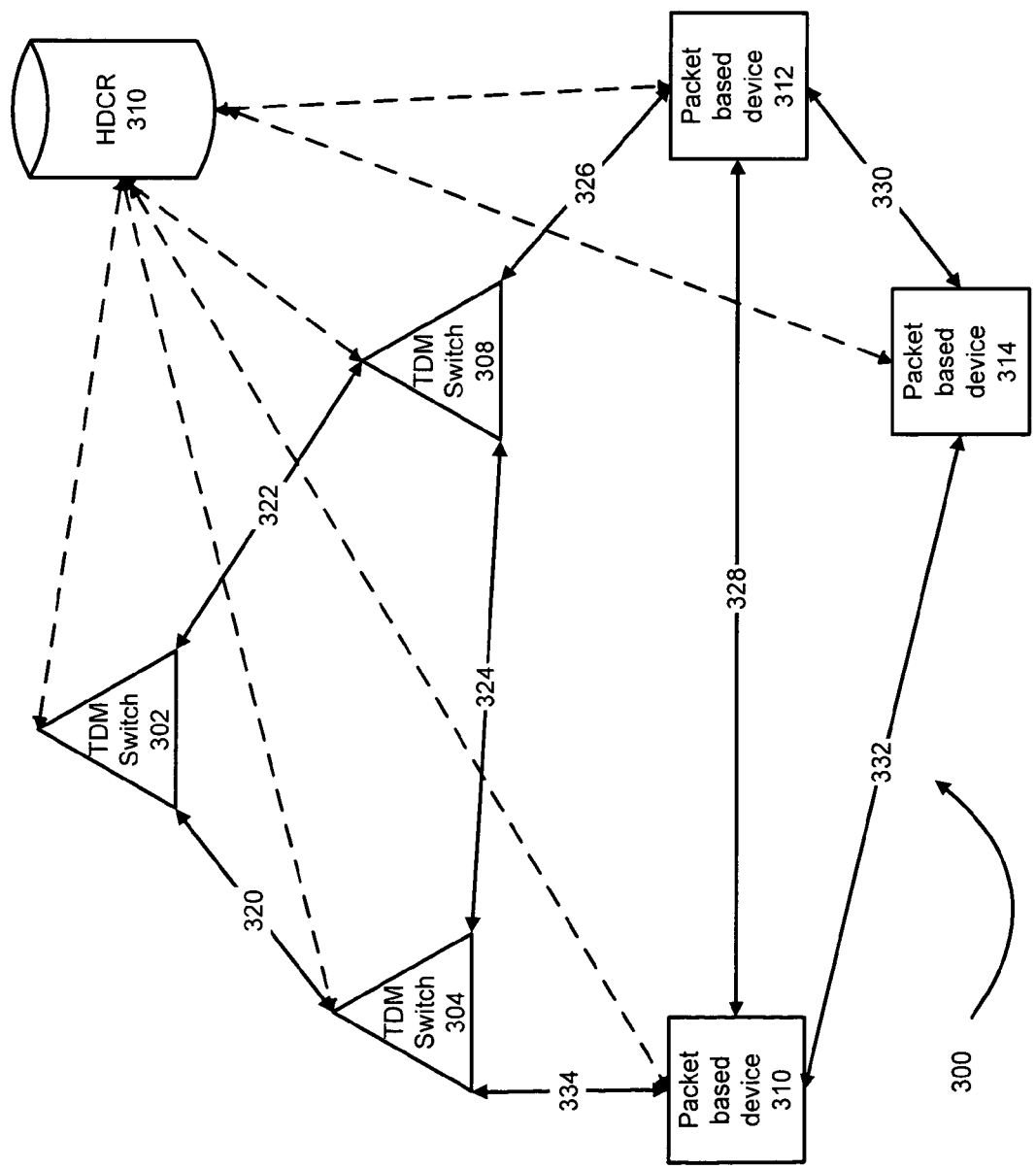
FIG. 3 is a switch level view of a hybrid dynamic connection routing architecture in an example embodiment of the invention.

FIGS. 2-3 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Network Architecture—FIG. 2

FIG. 2 illustrates network architecture 200 in an example embodiment of the invention. Network architecture 200 includes TDM network 202, packet based network 204, devices 208, 210, 212, 214, 216, 218, and Hybrid dynamic communication routing (HDCR) device 206. TDM network 202 is connected to packet based network 204. For clarity FIG. 2 only shows two connections between the two networks, but in practice there may be significantly more connections between the two networks. Devices 208 and 214 are connected to TDM network 202. Devices 210 and 216 are connected to both TDM network 202 and packet based network 204. Devices 212 and 218 are connected to packet network 204. Hybrid dynamic connection routing (HDCR) device 206 communicates with TDM network 202 and with packet based network 204. HDCR may also communicate with some or all of the devices. Devices 208, 210, 212, 214, 216, and 218 may be any number or type of devices connected to the networks. For example the devices may be a landline phone, a cell phone, a computer, a switch, a gateway to another network, the Internet, or the like.

In operation, when two devices need to communicate, the path for the communications will be based on the conditions of the different potential paths. For example, when device 208 needs to communicate with device 214, the route will be chosen based on the conditions along the potential paths. One potential path is using a route that only goes through TDM network 202. Another potential path is from device 208 into TDM network 202, from TDM network 202 to packet based network 204, from packet based network 204 back into TDM network 202, and then to device 214. This path utilizes the packet based network to enable the communications. By utilizing the packet based network, an internal bottleneck in the TDM network may be avoided or load balancing between the two networks may be enabled. The bottleneck may be a trunk or switch experiencing high utilization, or a component or system failure. A similar type of arrangement can be used for communications between devices 212 and 218 connected to the packet based network.

The two devices that need to communicate may be connected to both networks. For example, when device 210 needs to communicate with device 216, the two devices are both connected to the two different networks. Some examples of devices that may be connected to both types of networks are: personal computers (PC) and gateways to other networks. When the devices are connected to both networks, there are a number of available paths for the communications between the two devices. One path or route is from device 210 through TDM network 202 to device 216. This path only uses the TDM network for the communications between device 210 and 216. Another path only makes use of the packet based network. Some paths or routes utilize both networks. For example, one path is from device 210 to TDM network 202, from TDM network 202 to packet based network 204, and from packet based network 204 to device 216. In this path one device makes use of its connection to one of the networks and the other device makes use of its connection to the other network. In still another example of a potential path between device 210 and 216, device 210 may connect to packet based network 204, packet based network 204 would route the communications to TDM network 202, TDM network 202 would route the communications back to packet based network 204 and packet based network would route the communications to device 216.

HDCR would monitor the conditions of the routes inside each of the networks. The types of conditions monitored may vary depending on the type of network. For example, in a TDM network, switch CPU occupancy, trunk occupancy, or the like may be monitored. In a packet based network, hop count, latency, port utilization, or the like may be monitored. When conditions along a route develop a problem the HDCR will reconfigure the routing tables or SCP tables to redirect the formation of communication paths away from the route with the problem.

Switch Level View—FIG. 3

FIG. 3 illustrates a switch level view of architecture 300 in an example embodiment of the invention. Various features of architecture 300 could be incorporated in architecture 200 of FIG. 2. Architecture 300 has TDM switches 302, 304, and 308, hybrid dynamic communication router (HDCR) 310, packet based devices 310, 312, and 314, and links 320, 322, 324, 326, 328, 330, 332, and 334. TDM Switches 302, 304, and 308 are part of a TDM communications network and are connected by respective links 320, 322, and 324. Packet based devices 310, 312, and 314 are part of a packet switched network and are connected by respective links 328, 330, and 332. The packet based devices may be an ATM switch, a router, a gateway and softswitch, or the like. Links 320, 322, and 324 in the TDM network represent direct connections between their respective switches, for example trunks. Links 328, 330, and 332 in packet based network represent virtual links or tunnels between the packet based devices. The tunnels may be composed of a number of different physical components. For example, when device 310 represents the functionality of a gateway in combination with a softswitch, then link 328 may comprise a number of routers connecting device 310 to device 312. FIG. 3 shows the TDM network connected to the packet based network by the two links 334 and 326. In practice there may be significantly more connections between the TDM network and the packet based network but FIG. 3 has been simplified for clarity. HDCR monitors the conditions of the links between the different switches and devices and monitors the condition of the different switches and devices.

In one example embodiment of the invention, during normal conditions, when a communication needs to be routed between TDM switch 304 and TDM switch 308 the direct path through link 324 is used. When conditions across link 324 are no longer normal, then HDCR may redirect the communication between switches 304 and 308 to use a different route. HDCR may reroute communications for other reasons in addition to non-normal conditions, for example balancing network usage between the two networks, or for cost. Non-normal conditions may correspond to congestion across link 324 caused by heavy usage, heavy usage in one of the switches, or may be caused by a problem with the link, for example a component failure. HDCR monitors the conditions across the different communication paths. When a communication path or route is experiencing non-normal condition HDCR may route the communications to an alternate path. For example, when link 324 is experiencing non-normal conditions, HDCR will evaluate the condition of alternate communication routes. One alternate route is between switch 304 to switch 302 using link 320 and then from switch 302 to switch 308 using link 322. This path is inside the TDM network. Another alternate path is from switch 304 to packet based device 310 across link 334 and from packet based device 310 to packet based device 312 using link 328, and from packet based device 312 to switch 308 across link 326. This path uses the packet based network to complete the communication route.

The connection may not be between two switches in the TDM network when using this invention. In another example embodiment of the invention, when a path is needed between packet based device 310 and packet based device 312, and tunnel 328 is experiencing non-normal conditions, HDCR may reroute the communications using an alternate route. One alternate route is from packet based device 310 to packet based device 314 through link 332 and from packet based device 314 to packet based device 312 using link 330. This path is completely inside the packet based network. Another alternate path or route is between packet based device 310 and switch 304 using link 334, from switch 304 to switch 308 across link 324, and from switch 308 to packet based device 312 through link 326. This path completes the connection using the TDM network.

The path may not be between switches or devices in the same type of network when using the invention. In another example embodiment of the invention, when a route is needed between switch 304 and packet based device 310, and conditions are normal on link 334, the communications would be completed across link 334. However when the conditions are not normal along link 334, HDCR may use a different path for the communication. For example, HDCR may connect switch 304 to switch 308 using link 324, switch 308 would be connected to packet based device 312 using link 326, and packet based device 312 would connect to packet based device 310 using link 328.

In one example embodiment of the invention, when evaluating alternate paths for a communication route, the HDCR may evaluate all the potential paths and then choose the best path or the HDCR may evaluate a subset of the total number of potential paths and then select the best path from the subset of examined paths. In some cases, even when the direct link is experiencing heavy traffic, the direct link may still be the best link for the communication route. For example when the direct link is experiencing heavy traffic but all the alternate links are experiencing even heavier traffic, the direct link may be the best path. The best path may be determined based on bandwidth, a quality of service, latency, number of hops, minimum CPU usage, minimum trunk occupancy, or the like.

In another example embodiment of the invention, the HDCR may evaluate the potential paths in a sequence and stop when a path is found that meets the requirements for the communication path. For example, the HDCR may redirect communications to the first path that has a latency below a predetermined threshold. When evaluating potential paths in a sequence, the order or sequence that paths are examined may have a bias for one type of network over a different type of network. For example, when the connection is needed between two TDM switches, the HDCR may examine a number of alternate paths inside the TDM network, before examining alternate paths that use the packet based network.

We claim:

1. A communication system comprising:
   a time division multiplex (TDM) network having TDM communication paths between a first device and a second device;
   a packet network having packet communication paths between the first device and the second device; and
   wherein the TDM network and the packet network have hybrid communication paths through both the TDM network and the packet network between the first device and the second device;
   a hybrid dynamic communication routing (HDCR) device configured to monitor a set of conditions for the TDM communication paths, the packet communication paths, and the hybrid communication paths, and configured to process communication path requirements and the set of conditions to select one of the TDM communication paths, the packet communication paths, and the TDM communication paths to transfer communications between the first device and the second device, wherein the set of conditions comprise TDM trunk occupancy and packet latency.

2. The communication system of claim 1 wherein the first device comprises a telephone.

3. The communication system of claim 1 wherein the second device comprises a gateway.

4. The communication system of claim 1 further comprising transferring the communications over the selected communication path between the first device and the second device.

5. The communication system of claim 1 wherein the communication path requirements favor the TDM communication paths.

6. The communication system of claim 1 wherein the communication path requirements favor the packet communication paths.

7. The communication system of claim 1 wherein the communication path requirements favor the hybrid communication paths.

8. The communication system of claim 1 wherein the communication path requirements favor a communication network type if the first device and the second device use the communication network type.

9. The communication system of claim 1 wherein the conditions further comprise switch occupancy in the TDM network.

10. The communication system of claim 1 wherein the conditions further comprise hop count and port utilization in the packet network.

11. A method of operating a communication system, the method comprising:
    monitoring a set of conditions for a plurality of communication paths between a first device and a second device wherein the plurality of communication paths comprise at least a time division multiplex (TDM) communication path through a TDM network, a packet communication path through a packet network, and a hybrid communication path through both the TDM network and the packet network, and wherein the set of conditions comprise TDM trunk occupancy and packet latency;
    processing the set of conditions and communication path requirements, and in response, selecting one of the plurality of communication paths between the first device and the second device based on the set of conditions and the communication path requirements.

12. The method of claim 11 wherein the first device comprises a telephone.

13. The method of claim 11 wherein the second device comprises a gateway.

14. The method of claim 11 further comprising transferring communications over the selected communication path between the first device and the second device.

15. The method of claim 11 wherein the communication path requirements favor the TDM communication path.

16. The method of claim 11 wherein the communication path requirements favor the packet communication path.

17. The method of claim 11 wherein the communication path requirements favor the hybrid communication path.

18. The method of claim 11 wherein the communication path requirements favor a communication network type if the first device and the second device use the communication network type.

19. The method of claim 11 wherein the conditions further comprise switch occupancy in the TDM network.

20. The method of claim 11 wherein the conditions further comprise hop count and port utilization in the packet network.

* * * * *